Oct. 12, 1965    F. J. FONTANA ETAL    3,210,795
CASTER SOCKET
Filed May 2, 1962
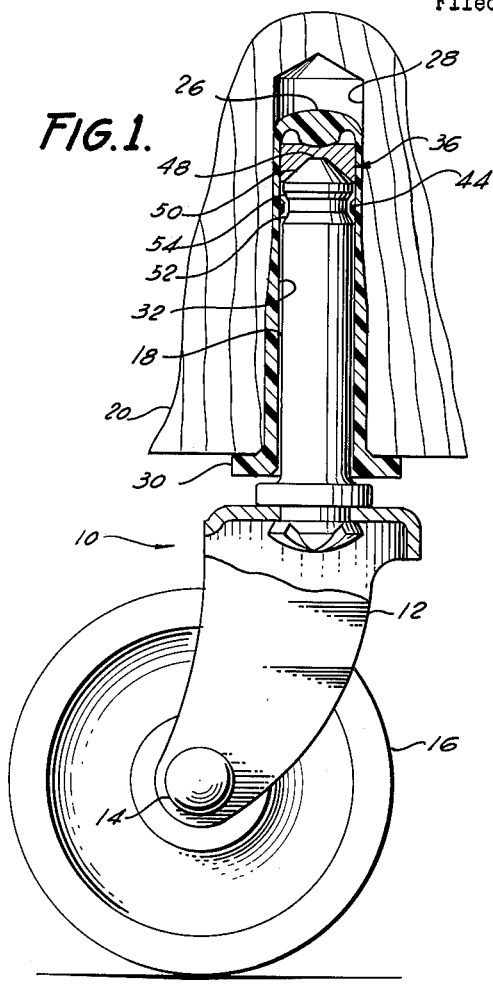
FIG. 1.
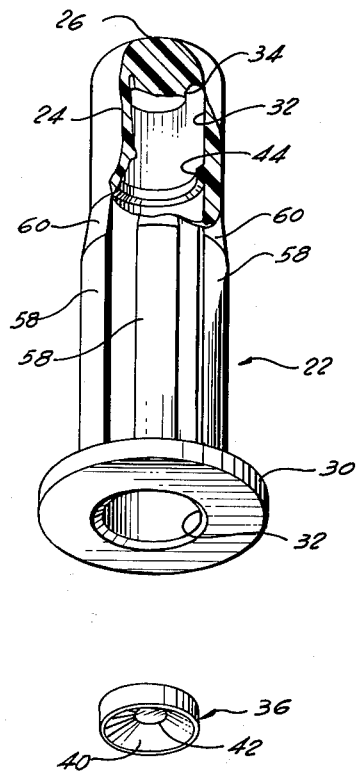
FIG. 3.
FIG. 4.
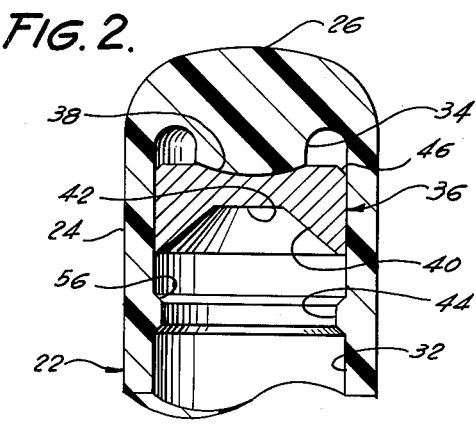
FIG. 2.
INVENTORS.
Frank J. Fontana
Michael Kramcsak, Jr.
By A. G. Douma
Attorney

United States Patent Office 3,210,795
Patented Oct. 12, 1965

3,210,795
CASTER SOCKET
Frank J. Fontana and Michael Kramcsak, Jr., Bridgeport, Conn., assignors to Stewart-Warner Corporation, a corporation of Virginia
Filed May 2, 1962, Ser. No. 191,933
1 Claim. (Cl. 16—43)

This invention relates to a caster mounting arrangement, and in particular, to a caster socket insertable into a receiving opening in the supported article and having a socket bore operable to receive and support a caster pintle for swivel movement of the caster about the pintle.

A caster commonly includes a pintle received within a caster socket which is fixed to a supported article within a socket receiving opening therein. Bearing means between the socket and pintle absorb the thrust of the pintle within the socket, and allow swivelling of the caster about the pintle. The large thrust forces acting on the small area of the bearing means cause high unit bearing pressures. Under such circumstances, proper bearing materials must be chosen to avoid rapid wear with use, or permit scoring of adjacent members moving relative to one another by bearing shavings therebetween. Additionally, the socket must be fixed to the supported article in a manner to avoid dislodging therefrom and the inconvenience and extra work required to resecure the socket.

Accordingly, an object of this invention is to provide an improved caster socket operable to receive and support a caster pintle for allowing swivel movement of the caster about the pintle.

Another object of this invention is to provide an improved caster socket which is readily fabricated of economical materials and which has long service life in use with the caster.

In order that these and other objects can be more fully appreciated, reference is herein made to the following specification and accompanying drawing forming a part thereof, wherein:

FIG. 1 is an elevational view of a caster, showing in longitudinal cross-section the subject caster socket in operative arrangement with the caster and a supported article;

FIG. 2 is an enlarged view, similar to FIG. 1, of the upper portion of the caster socket including a thrust bearing element therein;

FIG. 3 is a perspective view, partly broken away and in section, of the caster socket with the thrust bearing element removed; and FIG. 4 is a perspective view of the thrust bearing element shown in FIGS. 1 and 2.

Referring first to FIG. 1, the caster 10 includes a frame 12 supporting at axle 14 a wheel 16 for rotation relative to the frame along the supporting surface. A pintle 18 projects from frame 12 and is operatively secured to supported structure 20, only a portion of which is shown in broken away section. The subject caster socket 22 includes a cylindrical side wall 24 capped by top wall 26. The socket 22 is snugly received within receiving opening 28 in the structure 20. A rim 30 at the lower end of the side wall 24 abuts the structure 20 to limit inward movement of the socket relative to the structure.

The socket 22 defines a generally uniform bore 32 open at the end facing away from the supported structure 20. The pintle 18, receivable freely within the socket bore 32, generally conforms to but is smaller than the periphery of the bore along its entire length. The pintle 18 is thus supported against lateral forces relative to the supported structure 20 by contact thereof with the socket along opposed generally line contacts.

Referring now to FIGS. 2 and 4, the previously mentioned top wall 26 has a convex center abutment 34 which projects a limited distance from the main portion of the top wall. A small thrust bearing element 36 is receivable within the socket bore 32 in snug fit with the side wall 24. The upper side of element 36 is dished concave as at 38 adapted to complement the center abutment 34 on top wall 26. The lower side of element 36 is provided with a tapered frusto-conical surface 40 terminating on a generally flat central surface 42. Spaced a slight distance from the inserted thrust element 36, an annular rim 44 projects from the socket wall 24 to break the generally smooth bore 32.

The socket 22 is fabricated of plastic having generally tough strength characteristics while yet being slightly resilient. A plastic element such as nylon would adequately suffice. Thus the thrust element 36 can be forced into bore 32 past the binding rim 44 until direct abutment against the center projection 34, the side wall 24 and rim 44 giving slightly as the thrust element passes the rim. The upper corner edge of the thrust element is tapered inwardly, as at 46, to permit initial wedging of the element past the rim.

The pintle 18 is provided with bearing contours including a flat center surface 48 and an outward frusto-conical tapered surface 50 that are generally complementary to the surfaces 42 and 40, respectively, of the thrust element 36. Spaced a comparable distance from the inserted thrust element 36 of the socket, an annular recess 52 is provided in the pintle 18 which is adapted to receive freely the projecting rim 44. The outwardly facing shoulder 54 of the recess 52 thereby abuts the inwardly directed shoulder 56 of the rim 44 to limit unintentional retraction of the pintle from its operative arrangement within the socket. It is apparent, however, the pintle can be withdrawn from the socket past the projecting rim 44, by a sufficient removing force, as by the prying force of the tool between the frame 12 and rim 30.

It is noted that the projection of pintle 18 from the frame 12 is in excess slightly of the distance from the thrust element 36 to the open end of the bore 32. Thus when the pintle is in its operative position within a socket bore, axial thrust of the pintle into the socket is resisted solely by the complementary bearing surfaces of the pintle and the thrust element.

Referring now to FIGS. 1 and 3, the exterior of side wall 24 is provided with a plurality of longitudinally spaced separate ribs 58 which project outwardly slightly from the normal outside contour of the socket. Each rib includes a generally inward taper 60 inclined from the rib periphery to the socket periphery operable to ease the ribs initially into the socket opening 28. Driving the socket 22 into the receiving opening 28 firmly wedges the enlarged periphery of the ribs 58 against the structure 20 to secure the socket to the structure. The slight compressibility of the ribs and socket provides both a tight initial friction fit between the socket and the structure and slight residual expansion to overcome the slight settling after use of the binding elements.

It will be appreciated that the subject socket can be economically fabricated from a plastic material having slight resiliency and high strength capacities, such as nylon. The thrust element is a powdered bearing metal, such as a bronze alloy, which is self-lubricating. The improved separate socket and thrust element provides metal-to-metal bearing contact between the pintle and thrust element to reduce both wear and friction, and to insure proper metals of matching hardnesses. Thus there is little tendency to score the adjacent peripheries of the socket and pintle with shavings of a soften mismatched bearing material.

While a single embodiment of the subject invention has been shown, it will be obvious to those skilled in the art that other modifications can be made without departing from the inventive concept. Accordingly, it is desired that the invention be limited only by the claim hereinafter following.

What is claimed is:

An improved caster socket assembly for use in pivotally securing a cylindrically shaped caster pintle in a furniture leg opening with said pintle having a conical face at the upper end thereof and an annular recess spaced from said upper end, said assembly comprising a plastic socket having a cylindrical bore closed at one end and open at the other end for receiving said pintle, an annular rim formed on said socket intermediate the ends of said bore and projecting into said bore for engagement with said pintle recess, a rigid powdered metal cylindrical thrust bearing force fit into said bore between said closed end and said rim and having a conical recess therein for engagement with said conical pintle face, and a plurality of longitudinally extending ribs integrally formed on the outer surface of said socket with each rib having a curve conforming to the curvature of said furniture leg opening and tapering linearly to meet the other surface of said socket directly below said rim for creating a circumferential supporting force on said rim in response to the wedging of said socket and ribs into said leg opening to resist axial displacement of said thrust bearing with minimum of distortion of said rim and binding of said pintle against rotation.

References Cited by the Examiner
UNITED STATES PATENTS

| | | | |
|---|---|---|---|
| 821 | 6/38 | Blake et al. | 16—18 |
| 454,742 | 6/91 | Jordan | 16—43 |
| 955,162 | 4/10 | Humphrey | 16—43 |
| 1,395,484 | 11/21 | Diss | 16—18 |
| 1,656,508 | 1/28 | Claus. | |
| 2,571,868 | 10/51 | Haller. | |
| 2,973,546 | 3/61 | Roche | 16—43 |
| 3,020,104 | 2/62 | Nichols | 308—159 |

DONLEY J. STOCKING, *Primary Examiner.*